(12) United States Patent
Takeuchi et al.

(10) Patent No.: US 6,170,863 B1
(45) Date of Patent: *Jan. 9, 2001

(54) AIR BELT DEVICE

(75) Inventors: Hiroyuki Takeuchi, Hikone; Yoji Suyama, Aichi-gun, both of (JP)

(73) Assignee: Takata Corporation, Tokyo (JP)

( * ) Notice: Under 35 U.S.C. 154(b), the term of this patent shall be extended for 0 days.

This patent is subject to a terminal disclaimer.

(21) Appl. No.: 09/145,297

(22) Filed: Sep. 2, 1998

(30) Foreign Application Priority Data

Sep. 2, 1997 (JP) .................................................... 9-236910

(51) Int. Cl.$^7$ .................................................. B60R 21/18
(52) U.S. Cl. ............................................. 280/733; 280/807
(58) Field of Search ...................................... 280/807, 733

(56) References Cited

U.S. PATENT DOCUMENTS

| | | | | |
|---|---|---|---|---|
| 3,791,670 | * | 2/1974 | Lucore et al. .......................... | 280/733 |
| 3,801,156 | | 4/1974 | Granig et al. . | |
| 3,861,712 | * | 1/1975 | Matsui et al. .......................... | 280/739 |
| 3,866,940 | * | 2/1975 | Lewis .................................... | 280/733 |
| 3,884,499 | * | 5/1975 | Oka et al. ............................... | 280/739 |
| 3,929,348 | * | 12/1975 | Lawmill ................................. | 280/733 |
| 3,933,370 | * | 1/1976 | Abe et al. .............................. | 280/733 |
| 5,346,250 | * | 9/1994 | Kamiyama ............................. | 280/733 |
| 5,390,953 | * | 2/1995 | Tanaka et al. ......................... | 280/733 |
| 5,597,178 | * | 1/1997 | Hardin, Jr. ............................. | 280/733 |
| 5,765,869 | * | 6/1998 | Huber .................................... | 280/807 |

FOREIGN PATENT DOCUMENTS

| | | | |
|---|---|---|---|
| 2813285 | * 10/1979 | (DE) ..................................... | 280/733 |
| 0 765 780 A1 | 2/1997 | (EP) . | |

* cited by examiner

*Primary Examiner*—Brian L. Johnson
*Assistant Examiner*—Deanna Draper
(74) *Attorney, Agent, or Firm*—Foley & Lardner

(57) ABSTRACT

An air belt device which, after an air belt is deployed in a collision, can gradually discharge gas outside, thereby reducing the impact applied to the body of the occupant which is pushed against the air belt. Once an inflator 58 is actuated in the state that a tongue 14 is engaged with a buckle 16, seal members 61, 41 are opened by gas pressure so that gas is supplied through a first gas path 51 of the buckle 16 and a first guide path 21 of the tongue 14 to an air belt 2B so as to inflate the air belt 2B. After that, the gas pressure is applied to seal members 42, 62 so as to open the seal member 42, 62 so that the gas in the air belt 2B is discharged through a second gas path 52.

6 Claims, 11 Drawing Sheets

Figure 1B:
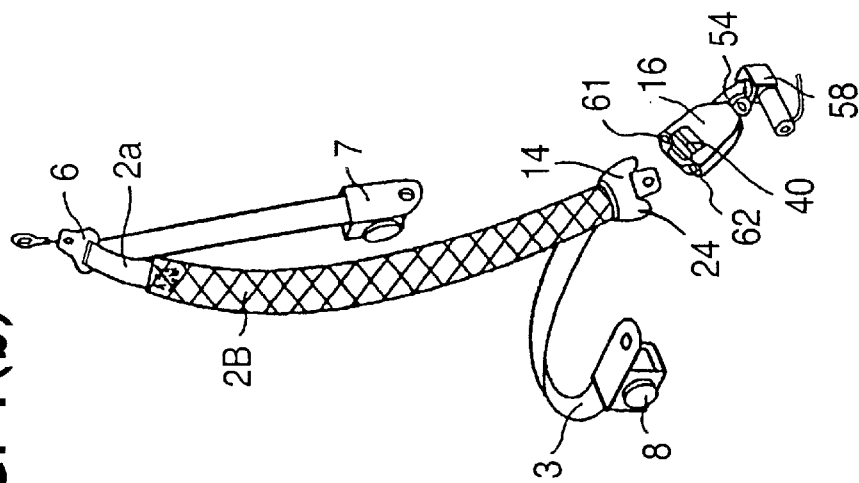

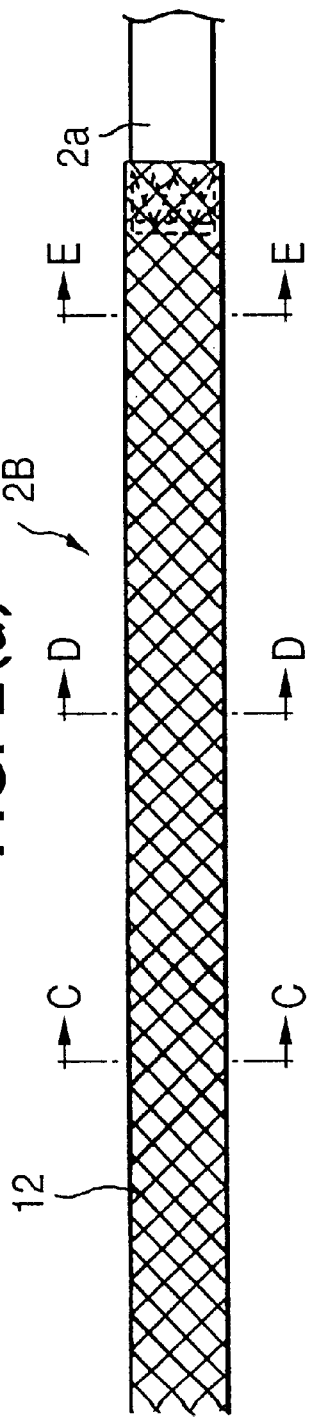
FIG. 2(a)
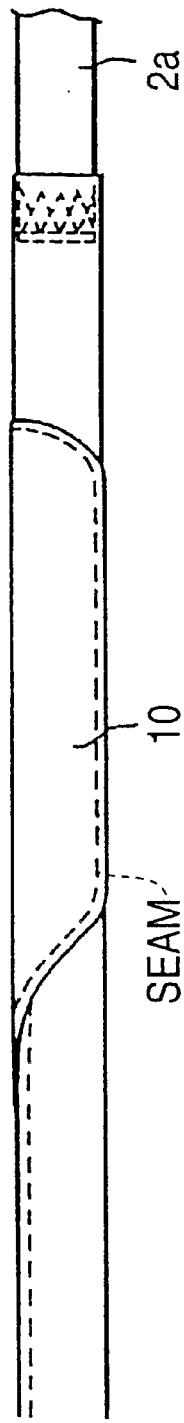
FIG. 2(b)
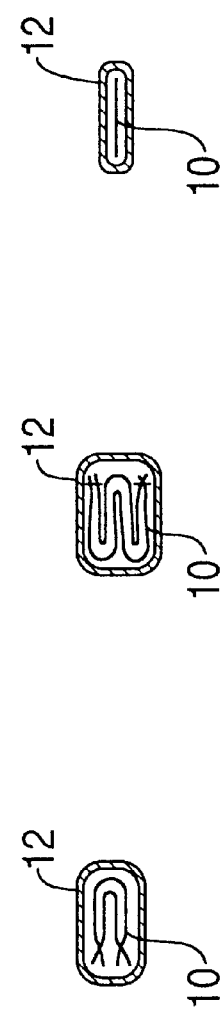
FIG. 2(c) FIG. 2(d) FIG. 2(e)

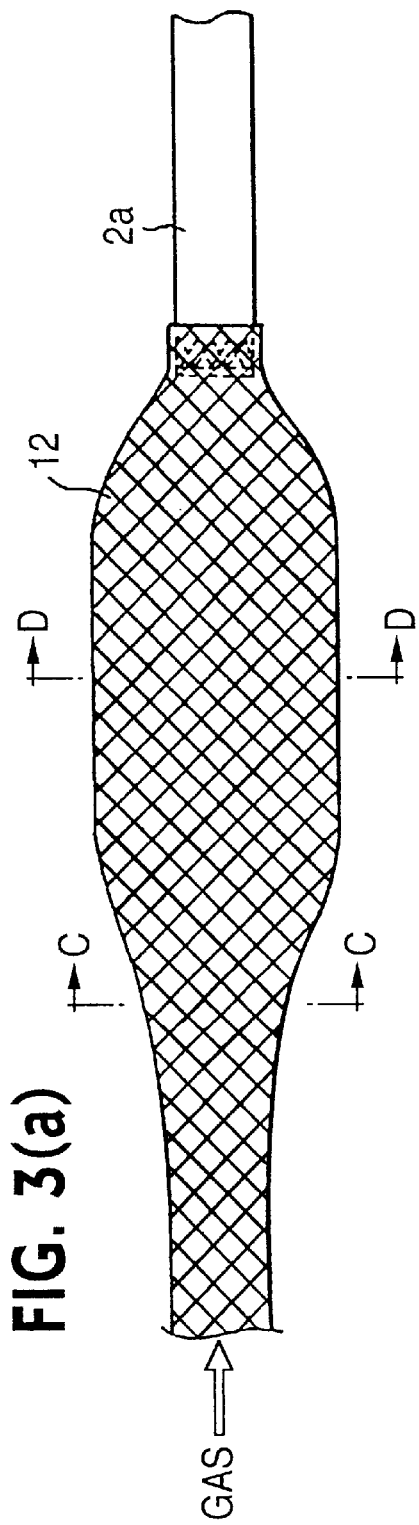
FIG. 3(a)
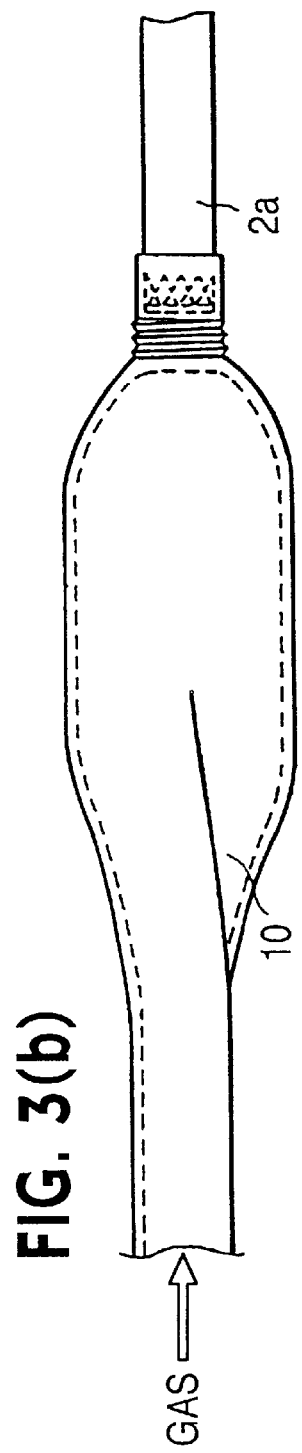
FIG. 3(b)
FIG. 3(d)
FIG. 3(c)

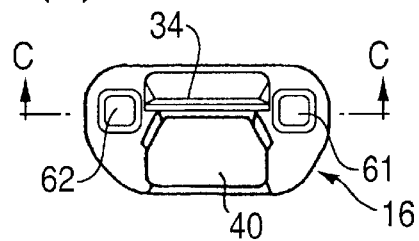
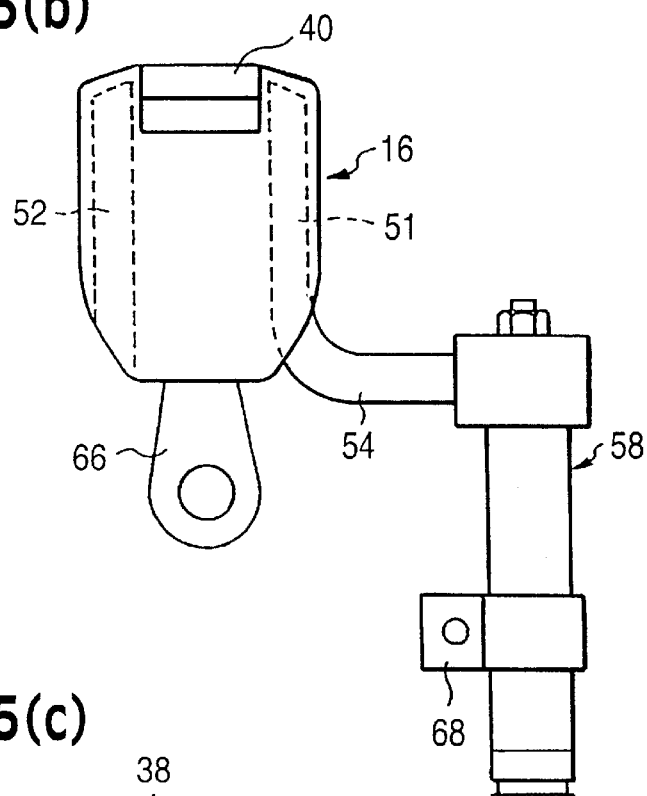
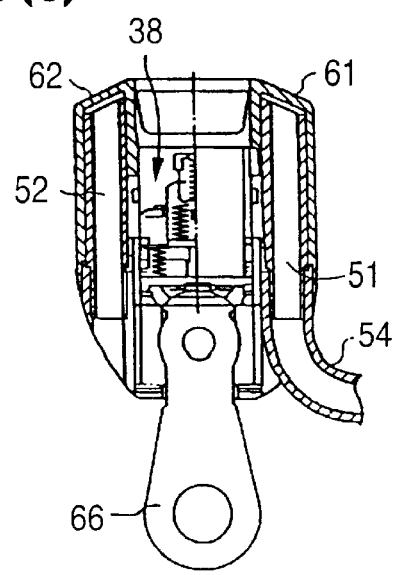

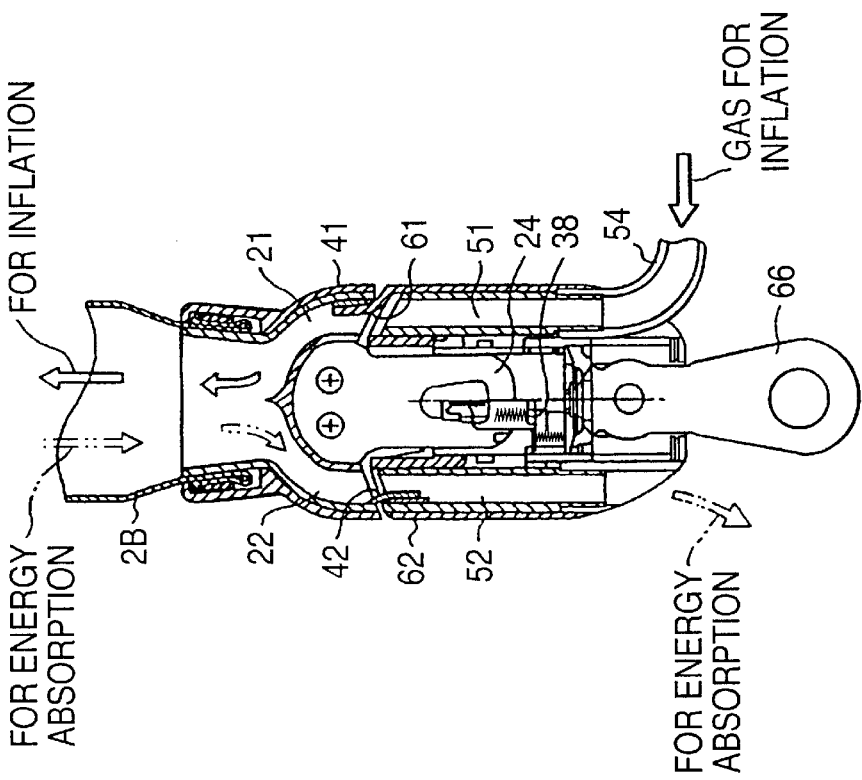
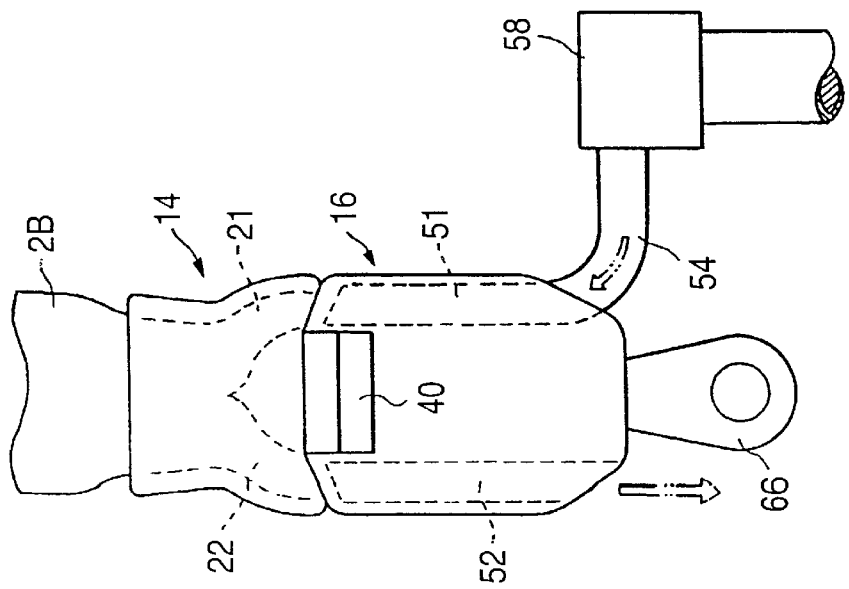

AIR BELT DEVICE

BACKGROUND OF THE INVENTION

The present invention relates to a seat belt device for protecting a vehicle occupant in a vehicle collision, and more particularly to an air belt device comprising an envelop-like or bag-shaped belt as a part of the seat belt which is inflated with gas from a gas generator.

One air belt device is described in Japanese Patent Unexamined Published Application No. H05-85301. FIG. 9(*a*) is a perspective view of an air belt device of the application and FIG. 9(*b*) is a sectional view taken along line B—B of FIG. 9(*a*).

The air belt device 1 comprises a shoulder belt 2 to be extended at an angle from the right side to the left side of an occupant, a lap belt 3 to be extended from the right side to the left side of the occupant, a buckle device 4 disposed at, for example, a vehicle floor, a tongue 5 to be inserted into and engaged with the buckle device 4 when the occupant wears the belt, and an intermediate guide 6 for guiding the shoulder belt 2.

The shoulder belt 2 comprises a normal belt 2*a* which is the same as a typical conventional seat belt, and an envelop-like belt 2*b* connected to an end of the normal belt 2*b*. The normal belt 2*a* is guided by and freely slides against the intermediate guide 6. The other end of the normal belt 2*a* is connected to a seat belt retractor 7 with an emergency locking mechanism (ELR) which is fixed to the vehicle body. The normal belt 2*a* is provided in such a manner as to be wound into the seat belt retractor 7.

The envelop-like belt 2*b* is positioned to be in contact with the occupant and is connected to the tongue 5 at an end opposite to the end connected to the normal belt 2*a*.

The lap belt 3 comprises a normal belt which is the same as a typical seat belt, of which one end is connected to the tongue 5 and the other end is connected to a seat belt retractor 8 with an emergency locking mechanism (ELR) which is fixed to the vehicle body. Connected to the buckle device 4 is a gas generator 9 which acts in case of emergency such as a vehicle collision to generate high-pressure gas.

The tongue 5 and the buckle device 4 are provided with paths for introducing gas from the gas generator 9 to the envelop-like belt 2*b*.

The envelop-like belt 2*b* of the shoulder belt 2 comprises a belt body 2*c* formed in an envelop shape and a cover 2*d*. The belt body 2*c* is folded as shown by solid lines in FIG. 9(*b*) and covered by the cover 2*d*. The both ends of the cover 2*b* are then connected by stitching 2*e* so that the envelop-like belt 2*d* is normally kept in a band-like shape. The stitching 2*e* of the cover 2*d* is easily torn by expansion force of the shoulder belt 2 when the gas generator 9 is actuated so that the envelop-like belt 2*b* is developed as shown by a two-dot chain line.

Disclosed in Japanese Patent Publication No. S63-39462 is an air belt device in which an inflatable cushion similar to an air belt is attached to a webbing of a seat belt device. The inflatable cushion is made of nylon sheets coated with neoprene rubber. The joint of the nylon sheets is made by suitably stitching in such a manner as to allow gas leak through the joint. The gas leak can reduce the impact applied to a vehicle occupant.

In the above structure for reducing the impact by allowing gas to leak through the joint between the sheets as described in S63-39462, there is a possibility that the gas leaked through the joint directly hits the vehicle occupant. The control of the amount of gas leaked through the joint is quite difficult in practice so that the amount of gas to be leaked can not be controlled to suitably reduce the impact.

SUMMARY OF THE INVENTION

The accompanying drawings, which are incorporated in and constitute a part of the specification, illustrate a presently preferred exemplary embodiment of the invention, and, together with the general description given above and the detailed description of the preferred embodiment given below, serve to explain the principles of the invention.

It is an object of the present invention to provide an air belt device which, after an air belt is deployed, can discharge gas in a suitable amount toward a suitable position outside the air belt.

An air belt device of the present invention comprises: an air belt which is inflatable; a gas generator for supplying gas into the air belt to inflate the air belt; and a belt engagement device including a tongue to which the air belt is connected and a buckle which the tongue is engaged with. The belt engagement device further includes a gas discharge means which, after the gas generator is actuated and the air belt is inflated, gradually discharges gas out of the air belt.

The air belt device according to the present invention has the gas discharging means which, after the gas generator is actuated to inflate the air belt, gradually discharges gas out of the air belt. Therefore, when an occupant is pushed strongly by the inflated air belt, the gas within the air belt is gradually discharged, thereby reducing the impact applied to the occupant.

Since, in the present invention, the belt engagement device composed of the tongue and the buckle includes the gas discharging means, the discharged gas is discharged to a lower portion of the cabin of the vehicle so that the gas never directly hits the occupant.

In the present invention, it is preferable that the buckle is provided with a first gas path into which gas is upwardly supplied from the gas generator and through which the gas is jetted out of a spout portion at the top of the buckle, and a second gas path into which gas from the air belt is downwardly introduced and through which the gas is discharged out of the buckle downwardly or laterally, and the tongue is provided with a first guide path connecting the first gas path and the inside of the air belt, and a second guide path connecting the inside of the air belt and the second gas path, and that the gas discharging means is composed of the second guide path and the second gas path. As the gas discharging means is composed of the second guide path and the second gas path as mentioned above, the amount of discharge gas can be controlled in a predetermined amount.

In this case, the second gas path is formed to open beneath the buckle so that the gas discharged from the air belt is discharged beneath the buckle, thereby securely preventing the gas from directly hitting the occupant.

In the present invention, the tongue and the buckle have seal members closing. The seal members prevent the ingress of foreign materials (such as refuse or dirt, dust, and sand particles) into the paths.

Additional objects, features and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

Figure 1A:
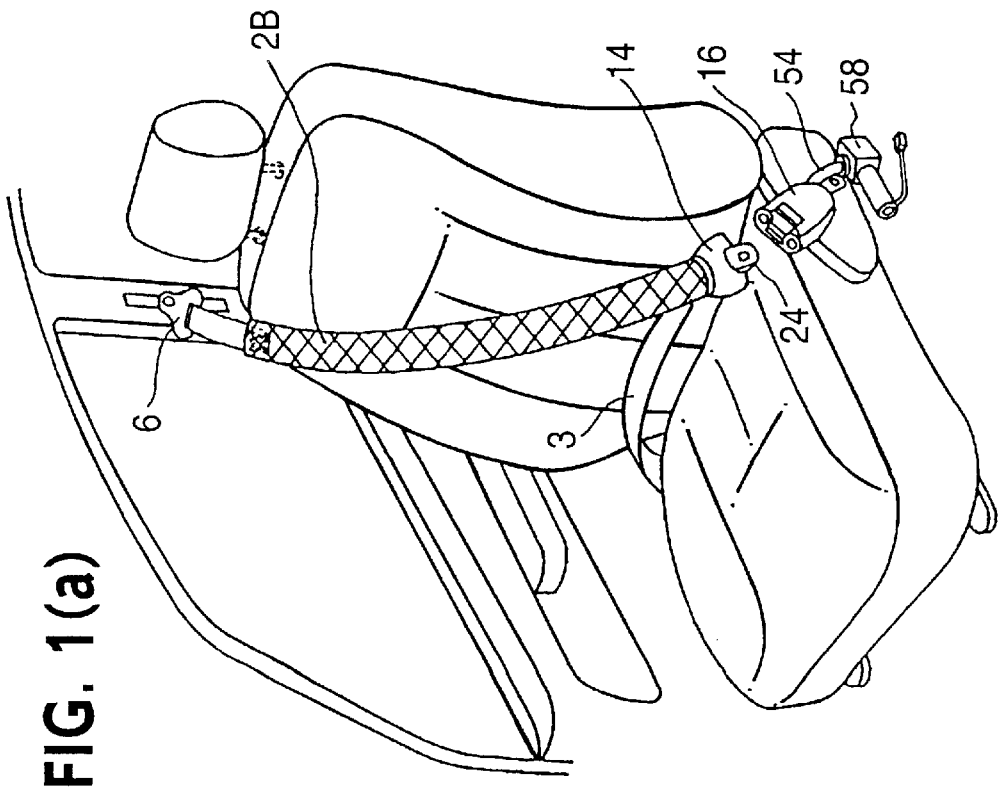

FIG. 1(a) is a perspective view of a seat on which an air belt device according to an embodiment is mounted and FIG. 1(b) is a perspective view of the air belt device.

FIGS. 2(a) through 2(e) are structural views of the air belt.

FIGS. 3(a) through 3(d) are structural views of the air belt in the deployed state.

Figure 4A:
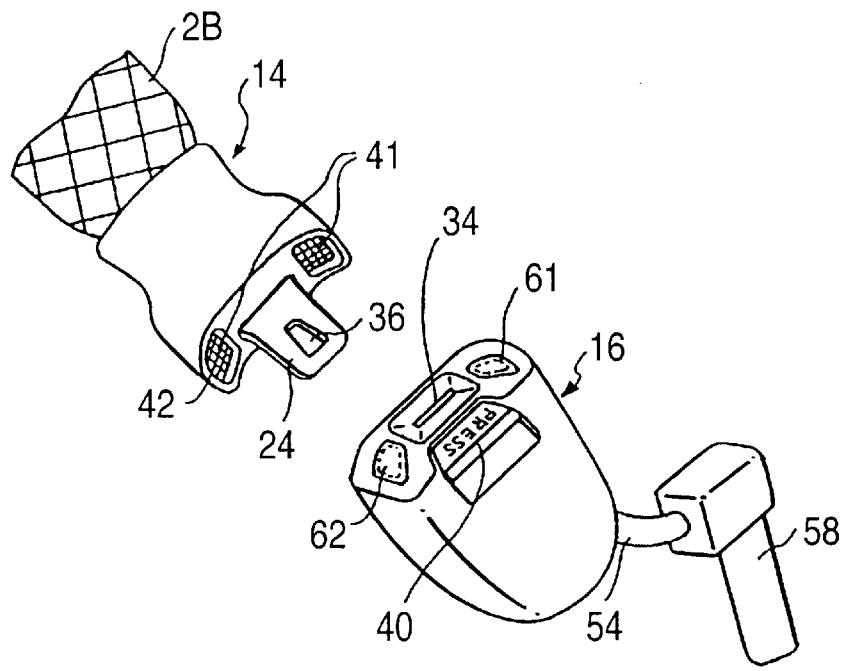
Figure 4B:
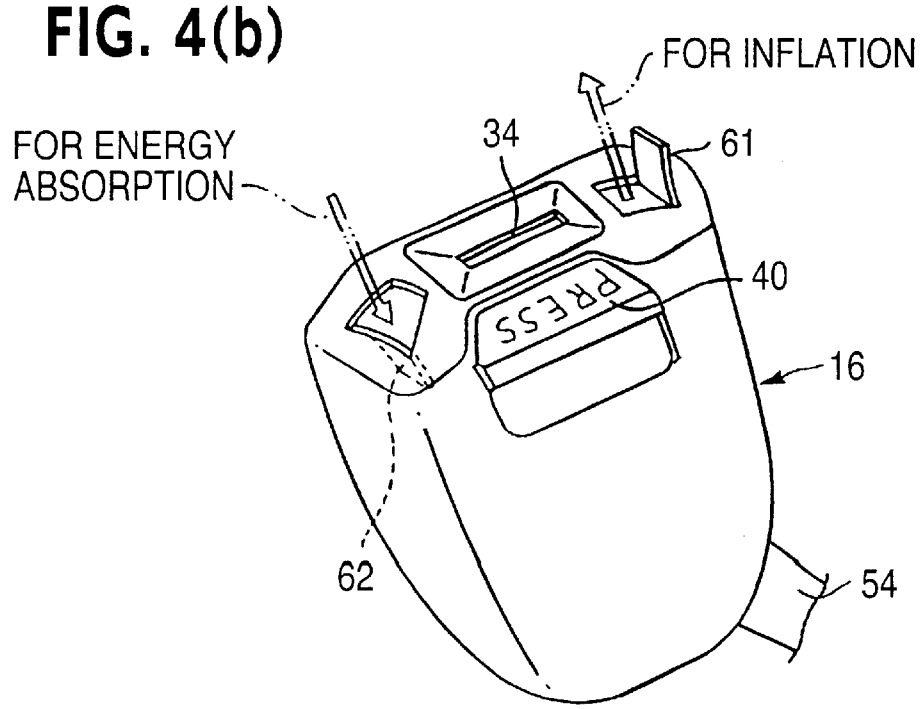
Figure 6A:
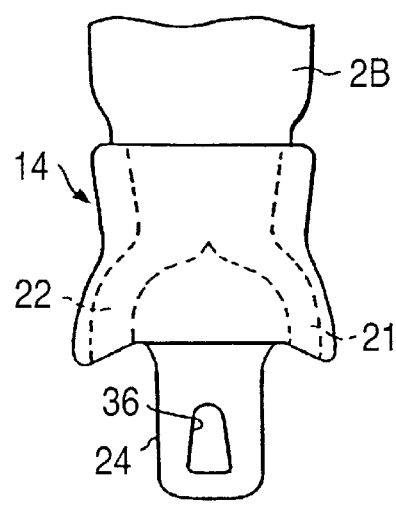
Figure 6B:
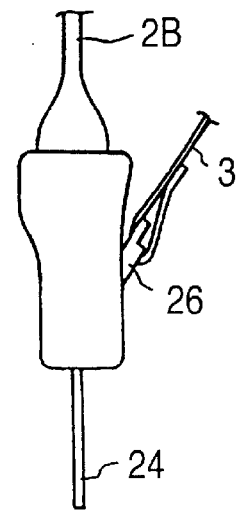
Figure 6C:
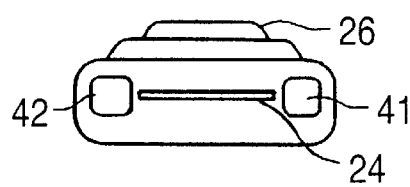
Figure 6D:
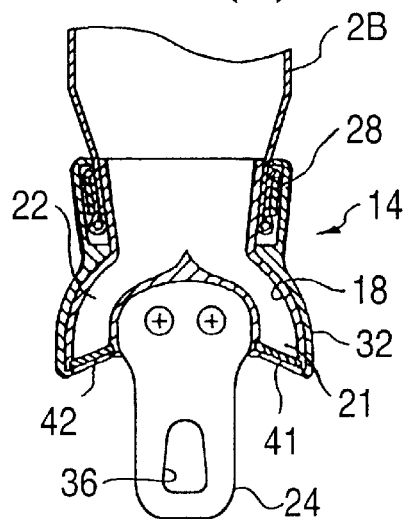

FIGS. 4(a) and 4(b) are structural views of a tongue and a buckle of the air belt device according to the embodiment of the present invention.

FIGS. 5(a) through 5(c) are structural views of the buckle.

FIGS. 6(a) through 6(d) are structural views of the tongue.

FIGS. 7(a) and 7(b) are a front view and a sectional view of the buckle and the tongue in the engaged state.

FIGS. 8(a) through 8(d) are perspective views showing alternatives of the buckles.

Figure 9A:
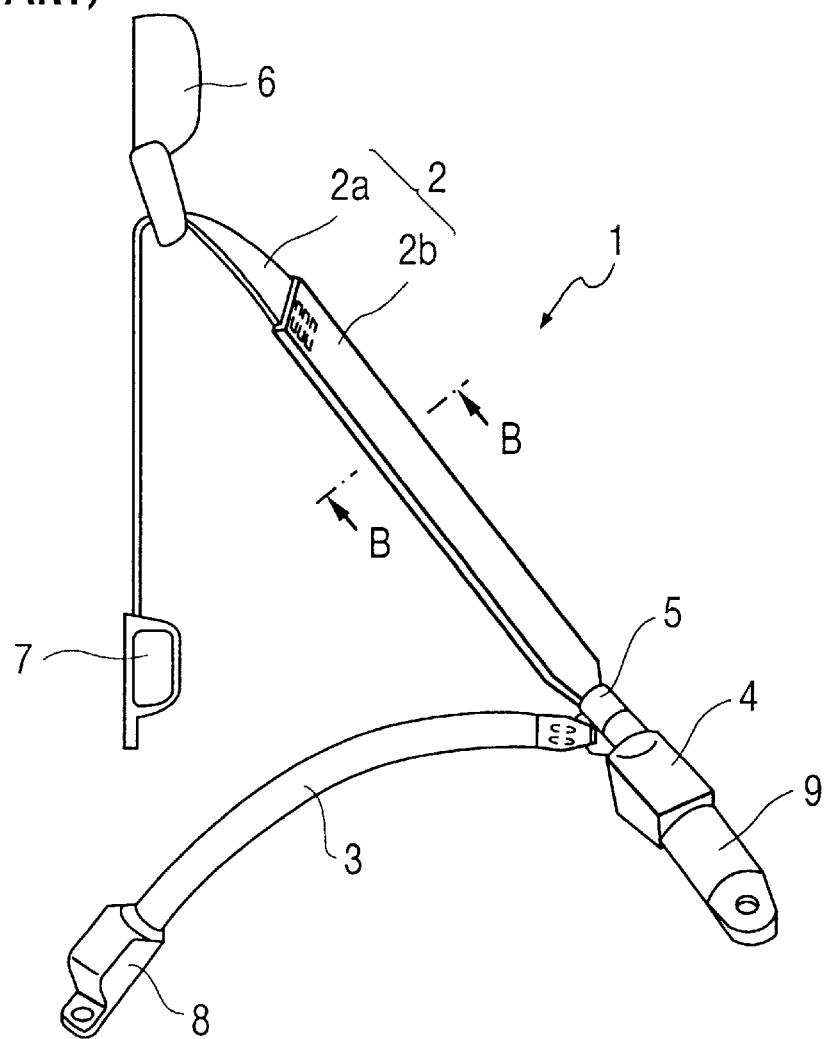
Figure 9B:
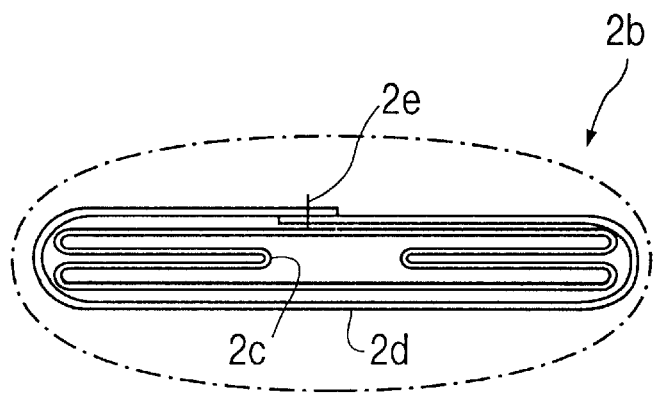

FIGS. 9(a) and 9(b) are structural views of a conventional air belt device.

FIGS. 10(a) and 10(b) are structural views of a knit cover.

FIGS. 11(a) and 11(b) are structural views of the knit cover.

DETAILED DESCRIPTION OF THE PREFERRED EMBODIMENT

Hereinafter, embodiments will be described with reference to the drawings. FIG. 1(a) is a perspective view of a cabin of a vehicle in which an air belt device according to one embodiment of the invention is mounted and FIG. 1(b) is a perspective view showing the air belt device. FIG. 2(a) is a plan view showing a portion around a joint between a shoulder belt and a lap belt, FIG. 2(b) is a plan view of an envelop-like belt, and FIGS. 2(c), (d), (e) are sectional views taken along lines C—C, D—D, and E—E, respectively. FIG. 3(a) is a plan view of the shoulder belt when the air belt is in the deployed state, FIG. 3(b) is a plan view of the envelop-like belt in the deployed state, and FIGS. 3(c) and 3(d) are sectional views taken along lines C—C and D—D, respectively. FIG. 4 through FIG. 7 are explanatory views of a belt engagement device.

As shown in FIG. 2 and FIG. 3, an air belt 2B comprises an envelop-like belt 10 and a knit cover 12 made of woven fabric and surrounding the envelop-like belt 10. The envelop-like belt 10 is formed in such a configuration that a portion confronting the chest and abdomen of an occupant in a seat has a larger area. The portion with the larger area is folded to be in a band-like configuration as shown in FIG. 2(b), 2(c) and 2(d).

Figure 10:
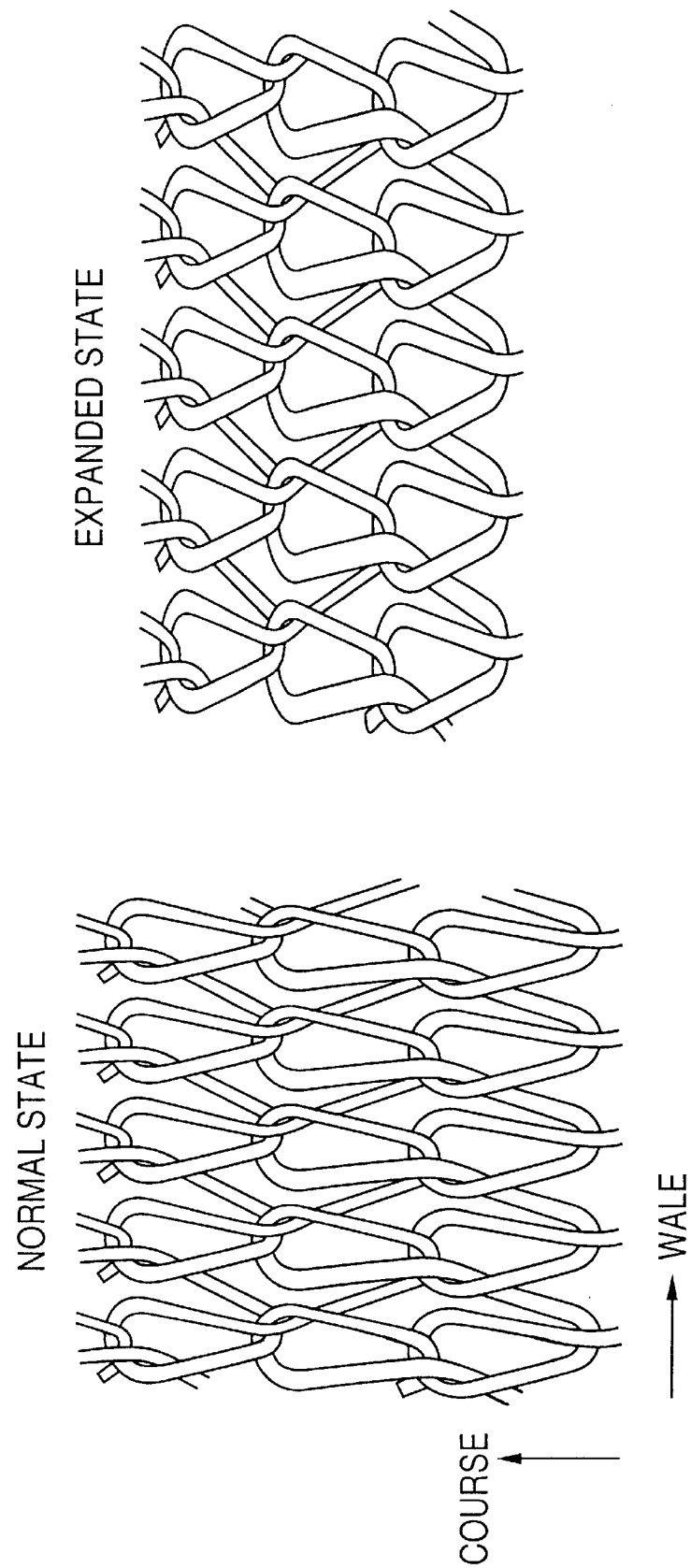
Figure 11:
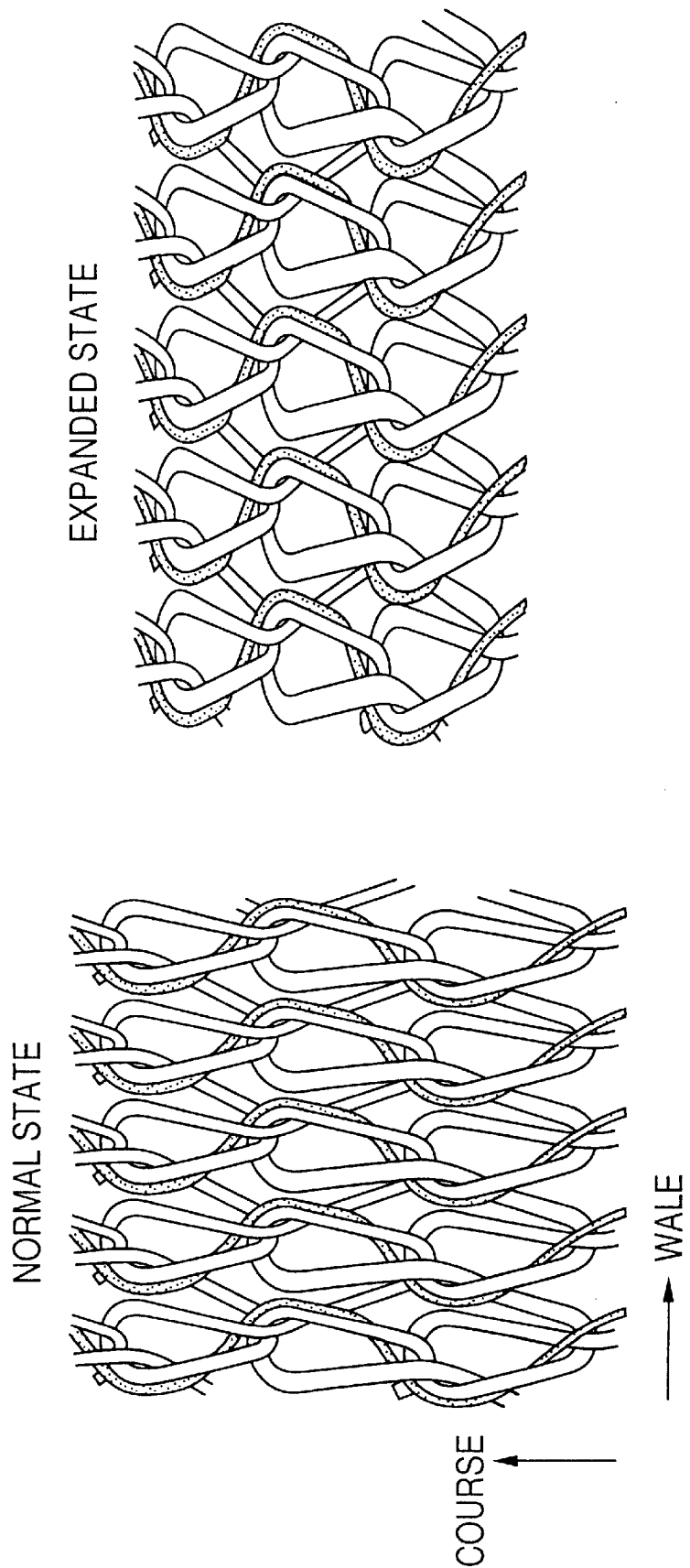

The knit cover 12 can be stretched in the width direction, but is hardly stretched in the longitudinal direction because it is processed by hot-drawing. The knit cover 12 is subjected to tensile load applied to the air belt 2B. In FIG. 10 and FIG. 11, illustrations at the left hand side show examples of ways of knitting the knit cover. FIG. 10 shows a normal warp knitting and FIG. 11 shows a warp knitting in which insert yarns are added to improve the strength and to allow the thickness to be more thin.

The air belt 2B and the normal shoulder belt 2a are connected by sewing. The envelop-like belt 10 and the knit cover 12 are both sewn to the normal belt 2a.

Once a gas generator is actuated in the state that the tongue is engaged with the buckle, the air belt 2B is inflated. At this point, the length of the knit cover 12 in the longitudinal direction of the air belt 2B is reduced so that the air belt 2B comes in close contact with the occupant, thereby securely protecting the occupant. In FIG. 10 and FIG. 11, illustrations at the right hand side show the state that the length of the knit cover 12 is reduced in the longitudinal direction when the air belt 2B (the envelop-like belt 10) is inflated. As mentioned above, the knit cover is hardly stretched in the longitudinal direction because it is processed by hot drawing. The knitted loops of the knit cover 12 are extended in the lateral direction when the envelop-like belt 10 is inflated. As a result of this, the knit cover 12 shrinks its length in the longitudinal direction to reduce the length of the air belt 2B in the longitudinal direction.

Hereinafter, the structure of a tongue and a buckle which can be suitably employed in the present invention will be described with reference to FIGS. 4 through 8.

FIGS. 4 through 7 show a first embodiment of a tongue and a buckle. FIG. 4(a) is a perspective view showing the tongue 14 and the buckle 16, FIG. 4(b) is an enlarged view of the buckle of FIG. 4(a). FIGS. 5(a) through 5(c) show the structure of the buckle of this embodiment, FIGS. 6(a) through 6(d) show the structure of the tongue, and FIGS. 7(a) and 7(b) are a front view and a sectional view showing the state that the tongue and the buckle are engaged with each other.

As clearly shown in FIG. 6, the tongue 14 comprises a tongue base 18 provided with a first guide path 21 and a second guide path 22 inside thereof, a tongue plate 24 and an anchor 26 which are connected to the tongue base 18, a ring 28 for fixing the air belt 2B to the tongue base 18, and a synthetic resin cover 32 for surrounding the tongue base 18.

The tongue base 18 has a cavity inside thereof. The cavity is divided into two branches extending toward the ends of the tongue (the side that is inserted into the buckle) whereby the first guide path 21 and the second guide path 22 are formed.

Each guide path 21, 22 has an opening at the ends of the tongue. The opening is closed by a seal member 41, 42. The seal member 41, 42 can be opened when gas pressure is applied, as mentioned later.

The anchor 26 is provided with an opening formed therein. The end of the lap belt 3 is inserted through the opening and then connected to the anchor 26.

The tongue plate 24 is inserted into a tongue-plate inlet 34 (FIGS. 4 and 5) of the buckle 16 such that a latch hole 36 is latched with a latch pawl of a latch mechanism 38 in the buckle 16. Pressing a press button 40 provided in the buckle 16 releases the latching. At the same time, the tongue plate 24 is pushed out of the buckle 16 by a spring.

As clearly shown in FIGS. 5(a) through 5(c), the buckle 16 is provided with a first gas path 51 and a second gas path 52 inside thereof. The first gas path 51 is connected to an inflator 58 (the gas generator) through a hose 54.

The top (the surface confronting the tongue) of the buckle 16 is provided with a seal member 61 for closing the first gas path 51 and a seal member 62 for closing the second gas path 52.

In this embodiment, the outer surface of the buckle 16 is covered by the synthetic resin cover 64 so that the seal members 61, 62 are formed integrally with the synthetic resin cover 64. The synthetic resin cover 64 is provided with tear lines formed in portions thereof above the gas paths 51, 52 so that areas surrounded by the tear lines become the seal members 61, 62. As the gas pressure is applied, the synthetic resin cover 64 is torn along the tear lines. As a result of this, the seal members 61, 62 open just like flaps as shown in FIG. 4(b).

The lower end of the second gas path 52 opens downwardly at the bottom of the buckle 16 whereby the gas from the second gas path 52 is discharged downwardly.

The buckle 16 and the inflator 58 have brackets 66, 68 for fixing them to the vehicle body member.

Hereinafter, the operation of the air belt as structured above will be described. The occupant sits in the seat and engages the tongue 14 with the buckle 16 as shown in FIG. 4(a).

In this state, once the inflator 58 is actuated at a vehicle collision, the seal member 61 is first opened by gas pressure as shown in FIG. 7(b) and the seal member 41 is then opened. The gas is supplied through the first guide path 21 in the tongue base 18 to the air belt 2B to inflate the air belt 2B. In this case, since the gas from the inflator 58 flows upwardly through the first gas path 51 and the first guide path 21, little gas pressure is applied to the seal member 42 so that the seal members 42, 62 are still closed.

When the air belt 2B is inflated, the length of the air belt 2B is reduced so that the air belt closely fits to the body of the occupant, as mentioned above.

When the air belt 2B is sufficiently inflated or the occupant is pushed by the inflated air belt 2B, the pressurized gas filled in the air belt 2B is applied to the seal member 42 through the second guide path 22 so that the seal member 42 opens downwardly and the seal member 62 then opens downwardly. The gas in the air belt 2B is gradually discharged outside through the second gas path 52. This reduces the impact applied to the body of the occupant which is pushed against the air belt 2B.

The gas discharged through the second gas path 52 is discharged downwardly from the buckle 16 so as not to directly hit the occupant.

In this embodiment, even when it is turned upside down, the tongue 14 can be engaged with the buckle 16 to allow the gas to flow in the buckle 16 and the tongue 14 in the same manner as the above.

In this embodiment, as shown in FIG. 7(b), the opened seal member 61, 42 cross the space between the tongue 14 and the buckle 16, thereby making it difficult for the gas to leak from the confronting surfaces in the lateral direction.

Figure 8A:
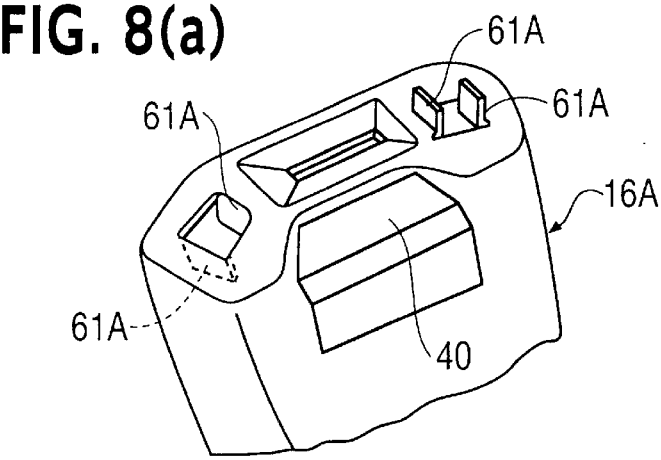
Figure 8B:
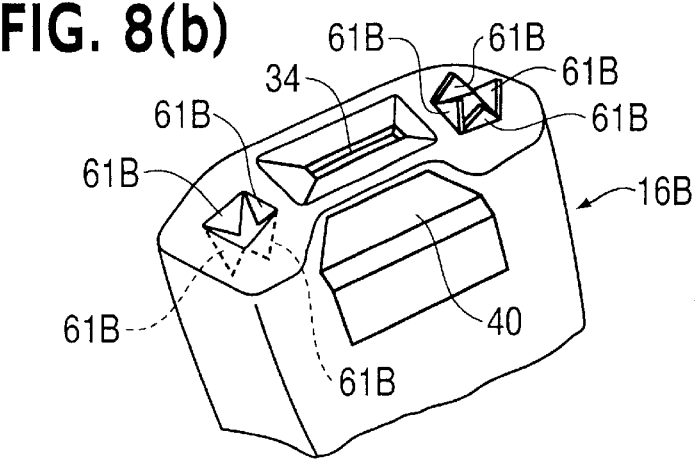
Figure 8C:
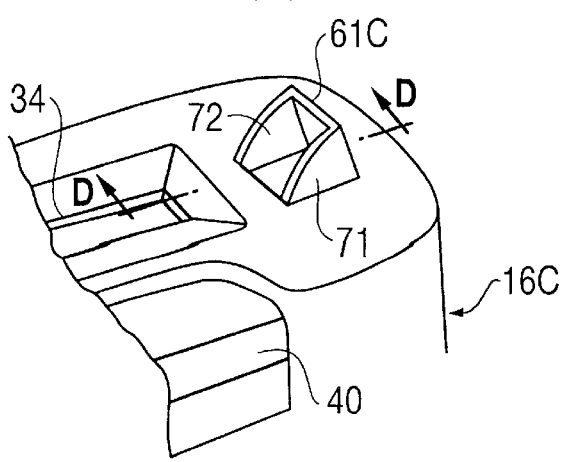

FIGS. 8(a) through 8(c) show structures of the seal members for actively preventing gas leakage from the confronting surfaces.

In FIG. 8(a), each seal member 61A of the buckle 16A is divided into two pieces to open. In FIG. 8(b), each seal member 61B of the buckle 16B is divided into four pieces to open.

It should be understood that the tear line is formed in a U-like shape for forming the seal member 61 in FIGS. 1 through 7, in an H-like shape in FIG. 8(a), and in an X-like shape in FIG. 8(b).

Figure 8D:
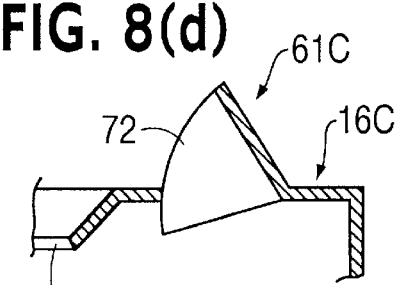

In the buckle 16C shown in FIGS. 8(c), 8(d), a seal member 61C has hood portions 71, 72 to surround three sides of gas spouting out of the first gas path 51. FIG. 8(d) is a sectional view taken along a line D—D of FIG. 8(c).

As mentioned above, in the air belt device of the present invention, after the air belt is inflated with gas, the gas is discharged by a discharging means, thereby significantly reducing the impact applied to the occupant.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

This application is one of seven copending applications filed on even date herewith:

| U.S. Ser. No. | Our Docket No. | Japanese Application No. |
| --- | --- | --- |
| Unknown | 086142/0203 | 09-236903 |
| Unknown | 086142/0204 | 09-236904 |
| Unknown | 086142/0205 | 09-236906 |
| Unknown | 086142/0206 | 09-236907 |
| Unknown | 086142/0207 | 09-236908 |
| Unknown | 086142/0208 | 09-236909 |
| Unknown | 086142/0209 | 09-236910 |

The instant application hereby incorporates by reference the entire specification including claims and abstract and the drawings of each of the other six applications.

What is claimed is:

1. An air belt device comprising:

an air belt which is inflatable;

a gas generator for supplying gas into said air belt to inflate said air belt; and a belt engagement device including a tongue to which said air belt is connected and a buckle which said tongue is engaged with;

wherein said belt engagement device further includes a gas discharge conduit which, after said gas generator is actuated and the air belt is inflated, gradually discharges gas out of the air belt; and wherein said gas discharge outlet is in the buckle.

2. An air belt device as claimed in claim 1, wherein said buckle is provided with a first gas path into which gas is upwardly supplied from the gas generator and through which the gas is jetted out of a spout portion at the top of said buckle, and a second gas path into which gas from said air belt is downwardly introduced and through which the gas is discharged out of the buckle downwardly or laterally, and said tongue is provided with a first guide path connecting said first gas path and the inside of said air belt, and a second guide path connecting the inside of said air belt and said second gas path, wherein said gas discharging conduit is composed of said second guide path and said second gas path.

3. An air belt device as claimed in claim 2, wherein said second gas path opens beneath said buckle.

4. An air belt device as claimed in claim 3, wherein said tongue and said buckle have seal members closing said gas paths and said guide paths, respectively, and said seal members are opened by gas pressure.

5. An air belt device as claimed in claim 2, wherein said first gas path and said second gas path are fluidly isolated in the buckle.

6. An air belt as claimed in claim 1, wherein said belt engagement device and said buckle each include at least one seal member.

* * * * *